May 21, 1940.  W. B. TURNER  2,201,413
ANGLE CUTTING MULTIPLE BAND SAW
Filed Dec. 10, 1938  2 Sheets-Sheet 1

INVENTOR,

ATTORNEYS.

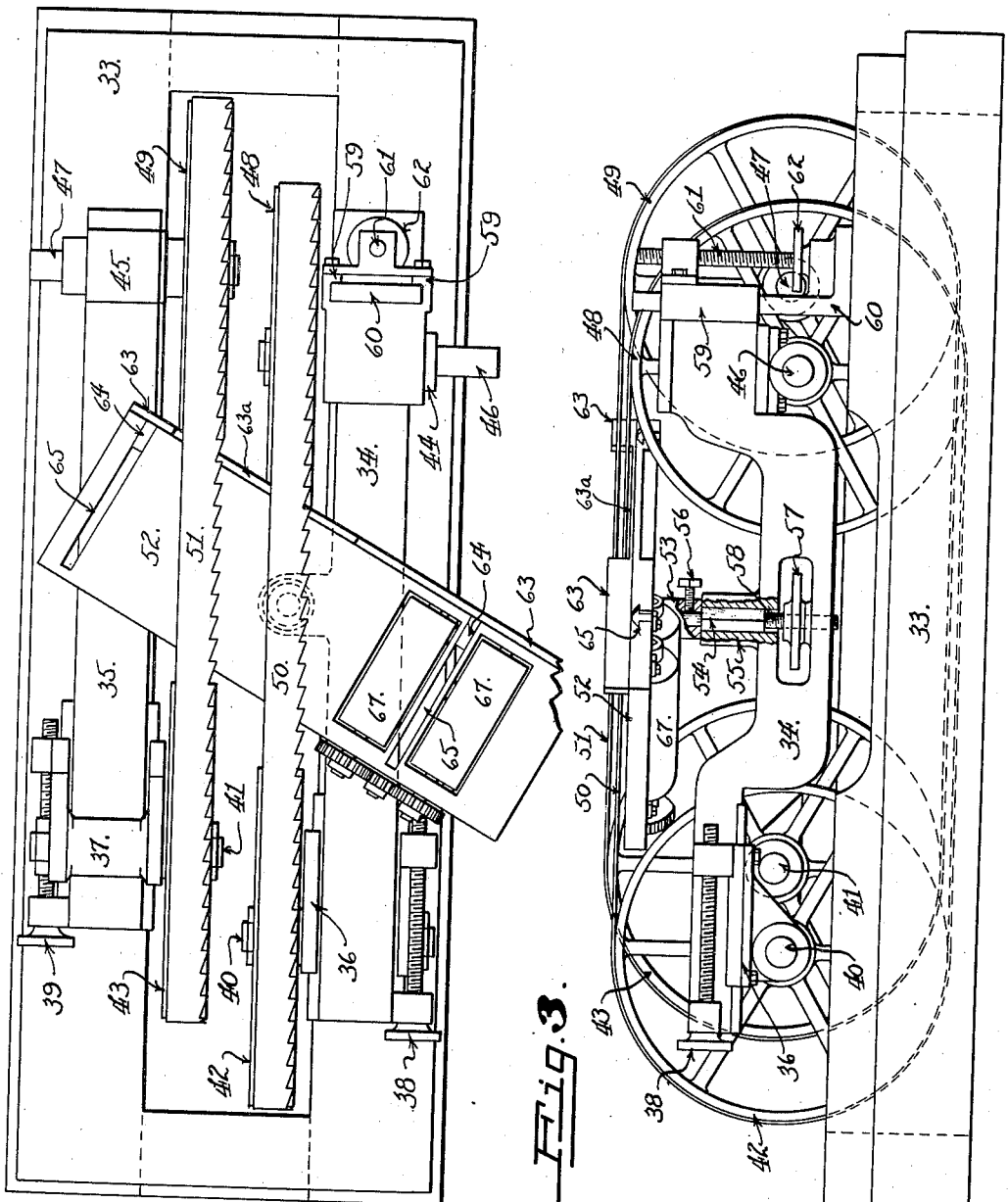

Patented May 21, 1940

2,201,413

UNITED STATES PATENT OFFICE 2,201,413

ANGLE CUTTING MULTIPLE BAND SAW

William B. Turner, San Francisco, Calif.

Application December 10, 1938, Serial No. 244,973

3 Claims. (Cl. 143—20)

The present invention relates to multiple band saw machines of the type adapted to make two or more simultaneous parallel cuts in the same stock.

The invention may be applied to band saws for any purpose, but is herein shown and described as embodied in band saws designed for re-cutting previously sawn stock into narrower or thinner boards, strips or slats. Such machines are known in the trade as re-saws.

One of the objects of the invention is to provide a multiple band saw in which the direction of feed of the stock forms an acute angle with the direction of movement of the saw, thus permitting a cleaner and narrower cut to be made than is possible with a feed angle of 90 degrees. For instance, in cutting Venetian blind slats, it is possible to cut one more slat from two inch stock with an angle feed than can be done with a 90 degree feed, because with angle feed, the set of the saw teeth, and hence the width of the saw cut, can be less than is possible with 90 degree feed.

Another object of the invention is to provide a multiple band saw in which the lengths of the unsupported portions of the saws are reduced to a minimum, resulting in better and faster cutting action. A further object is to provide an adjustable feed table, which permits adjustment both of the feed angle, and of the position of the stock along the saw, so that stock of any width can be cut as close as possible to the band wheel from which the saw runs. A still further object is to provide a multiple band saw in which the saws travel horizontally, thereby greatly simplifying the means for adjusting or varying the feed angle.

These and other objects and advantages of the invention will become apparent from the following specification, which should be read with the understanding that the form, construction and arrangement of the several parts herein shown and described can be varied, within the limits of the claims hereto appended, without departing from the spirit of the invention as defined in said claims.

In the accompanying drawings,

Figs. 2 and 3 are respectively a plan and a front elevation of another form of the invention, hereinafter referred to as a horizontal machine.

Figure 1:
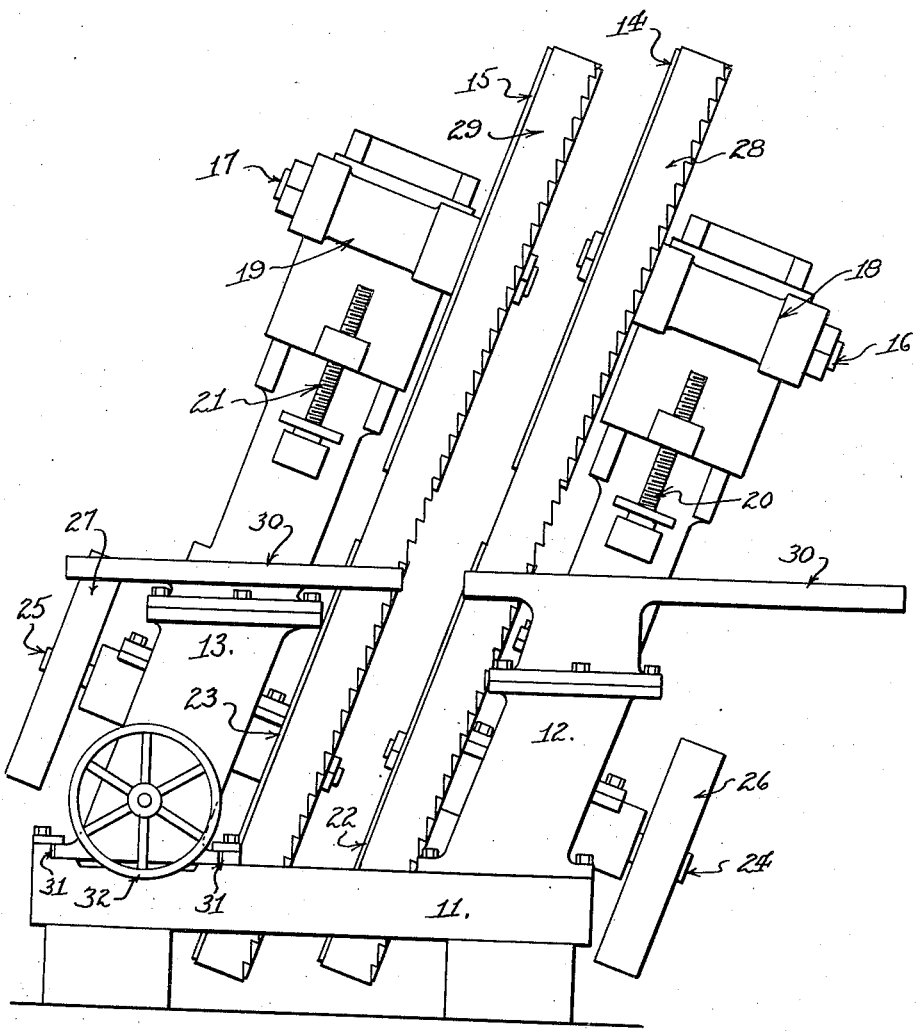
Fig. 1 is a front elevation of one form of band saw embodying the invention, which will be referred to hereinafter as an upright machine.

The upright machine illustrated in Fig. 1 has a base 11 and two standards 12 and 13 rising therefrom at an angle to the vertical as shown. The standards have upper band wheels 14 and 15 respectively mounted upon shafts 16 and 17 journaled in bearing members 18 and 19, said bearing members being movable in the standards and provided with screws 20 and 21 by which the tension of the saws can be adjusted. Lower band wheels 22 and 23 are mounted on shafts 24 and 25 journaled in the lower portions of the standards 12 and 13, and provided with driving pulleys 26 and 27. A band saw 28 runs over the wheels 14 and 22 and a band saw 29 runs over the wheels 15 and 23. A horizontal feed table 30 is secured to the standards 12 and 13 and extends across both saws.

As will be seen from Fig. 1, the saws 28 and 29 are parallel, and run at an angle to the vertical, thereby causing the stock, which rests upon and moves across the feed table 30 from right to left, to be fed to the saws at an acute angle to their direction of movement. The band wheels and saws are spaced apart sufficiently to enable the saws to be slipped off said wheels when it is necessary to remove them for resharpening or replacement. The feed table 30 is made in two sections, as shown, to facilitate removal of the saws, and to permit horizontal adjustment of one of the saws, as will be described presently.

The left hand standard 13 is adjustable forward and backward in the base, and is mounted in guides 31 for this purpose. Suitable means, such as a screw and nut mechanism (not shown) operated by a hand wheel 32 is provided for moving said standard 13 toward the front or rear, which movement also moves the saw 29 and thereby adjusts the spacing between the cuts made by the two saws, i. e. it adjusts the thickness of the board or strip that is cut from the stock. The left hand portion of the feed table 30 moves with the standard 13.

The shafts 16 and 17 are out of line with each other, as shown, and so are the shafts 24 and 25. The off-set is sufficient to bring the peripheries of the band wheels 14 and 15 in the same horizontal plane. The same is true of the band wheels 22 and 23. As a result, the feed table 30 and the stock thereon intersects both saws at the same distance from their respective band wheels, and as a further result, each pair of band wheels, i. e. 14, 22, and 15, 23, can be closer together than would be possible if the axes of the two pairs of wheels were in line. This permits a shorter unsupported run for both saws. That is to say, if the shafts 17 and 25 were respectively aligned with the shafts 16 and 24, the feed table 30 would have to be higher in order to clear the band wheel 23, and the saws would have to be longer in order to enable the band wheel 14 to clear the top of the work on the feed table. Therefore, by offsetting the axes of the two pairs of band wheels, I am able to reduce the length of the saws.

The feed or cutting angle of the machine shown in Fig. 1 cannot be adjusted. Although it would be possible to do so, for example by mounting the feed table 30 for tilting adjustment, such adjustment would present difficulties in operation of the machine. Therefore, when an adjustable cutting angle is desired, I prefer the horizontal machine shown in Figs. 2 and 3.

In this machine (Figs. 2 and 3) an elongated rectangular hollow base 33 supports two horizontal frames 34 and 35, which have longitudinally adjustable bearing members 36 and 37 at their left hand ends. Screw and nut means 38 and 39, respectively, move said bearing members to adjust the tension of the saws. Shafts 40 and 41 are journaled in the bearing members 36 and 37 and carry band wheels 42 and 43. At the right hand end of the frames 34 and 35 are fixed bearing members 44 and 45, in which shafts 46 and 47 are journaled, carrying band wheels 48 and 49. A band saw 50 runs over the wheels 42 and 48, and a second band saw 51 runs over wheels 43 and 49.

A horizontal feed table 52 is positioned beneath the upper runs of the saws, and has a downwardly extending support 53 rotatably mounted upon a non-rotatable stud 54 which is vertically slidable in a socket 55 rising from the frame 34. A set screw 56 secures the feed table in adjusted angular position, and a hand wheel 57 raises and lowers it, said hand wheel being a nut screwed upon the threaded lower end 58 of the stud 54. Thus the feed table is adjustable both vertically and angularly in its horizontal plane.

The feed table is set at an acute angle to the direction of travel of the saws, and this angle can be adjusted as described in the preceding paragraph. Thus the best cutting angle for the particular kind of wood being cut can be secured by a simple and quickly made adjustment. Likewise, the thickness of the first board or strip cut, i. e. the vertical distance between the feed table and the lower saw 50, can be adjusted by raising or lowering said feed table by means of the hand wheel 57.

The thickness of the second cut, i. e. the vertical distance between the two saws, is adjusted by raising or lowering the entire frame 34, carrying with it the first saw 50 and the feed table 52. For this purpose, the frame 34 is supported from one end by vertical guides 59 sliding on a fixed bracket 60 rising from the base, and a screw and nut mechanism 61 with a hand wheel 62 is provided for raising and lowering said frame in said guide.

The axes of the two pairs of band wheels are out of line, in the same manner and for the same purpose as described before in connection with Fig. 1, viz: to permit the use of the shortest possible band saws. It is desirable, moreover, that cutting should take place as close as possible to the left hand wheels, from which the saws run, because at this point the saws have greater stability than farther along toward the right hand wheels. When sawing wide stock, of course, the rear or trailing edges of the cuts must necessarily be near the right hand wheels, but when sawing narrow stock, I prefer to position it near the left hand or leading edge of the feed table 52.

Figure 4:
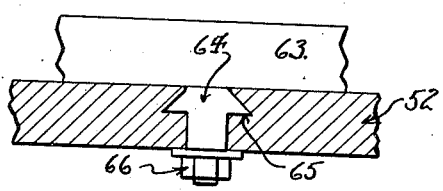
Fig. 4 is a detail, enlarged, of the adjustable edge guide of the horizontal machine shown in Figs. 2 and 3.

For this purpose, the edge guide 63 of the feed table is laterally adjustable. Said guide 63, which is cut out to enable the saws to pass over it, as shown at 63a in Figs. 2 and 3, is mounted upon blocks 64 sliding in under-cut slots 65 in the feed table, and are held in any desired position by nuts 66, one of which is shown in Fig. 4. Therefore, when sawing narrow stock, the guide 63 is shifted over toward the left, as viewed in Fig. 2, so that the work is performed as close as possible to the left hand band wheels. The feed table may be provided, as usual, with feed rollers indicated at 67.

I claim:

1. In a band saw machine, a plurality of pairs of horizontally spaced band wheels, a band saw running over each pair of wheels, the free runs of said saws being horizontal, means for moving one of said saws vertically to vary the vertical spacing between the two saws, a feed table having a guide along which the work is advanced, said table being positioned with said guide forming an acute angle with the direction of travel of said saws, means for varying the vertical distance between said feed table and the lowermost saw, and the axes of the adjacent pairs of band wheels being offset in a direction parallel with the direction of travel of the free runs of said saws, whereby the corresponding wheels of each pair are approximately equidistant from the sides of said table.

2. In a band saw machine, a plurality of pairs of horizontally spaced band wheels, a band saw running over each pair of wheels, the free runs of said saws being horizontal, means for moving one of said saws vertically to vary the vertical spacing between the two saws, a feed table having a guide along which the work is advanced, said table being positioned with said guide forming an acute angle with the direction of travel of said saws, means for angularly moving said feed table in a horizontal plane to vary the feed angle of the work, and means for varying the vertical distance between said feed table and the lowermost saw.

3. In a band saw machine, a plurality of pairs of spaced band wheels, a band saw running over each pair of wheels, the free runs of said saws being parallel, means for moving one of said saws toward and away from the other saw to vary the vertical spacing between the two saws, a feed table along which the work is advanced, said table being positioned to feed the work at an acute angle to the direction of travel of said saws, means for angularly moving said feed table to vary said feed angle of the work, means for varying the distance between said feed table and said saws, and the axes of the adjacent pairs of band wheels being offset in a direction parallel with the direction of travel of the free runs of said saws, whereby the corresponding wheels of each pair are approximately equidistant from said table.

WILLIAM B. TURNER.